United States Patent
Wang et al.

(10) Patent No.: US 12,333,266 B2
(45) Date of Patent: Jun. 17, 2025

(54) TRAINING METHOD, TEXT TRANSLATION METHOD, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Xiyang Wang, Beijing (CN); Ruiqing Zhang, Beijing (CN); Zhongjun He, Beijing (CN); Zhi Li, Beijing (CN); Hua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 235 days.

(21) Appl. No.: 17/982,965

(22) Filed: Nov. 8, 2022

(65) Prior Publication Data

US 2023/0076471 A1 Mar. 9, 2023

(30) Foreign Application Priority Data

Nov. 16, 2021 (CN) .......................... 202111358246.2

(51) Int. Cl.
*G06F 40/58* (2020.01)
*G06F 40/279* (2020.01)
(Continued)

(52) U.S. Cl.
CPC .............. *G06F 40/58* (2020.01); *G06F 40/51* (2020.01)

(58) Field of Classification Search
CPC .......... G06F 40/58; G06F 40/51; G06F 40/42; G06F 40/279; G06F 40/30; G06F 40/289;
(Continued)

(56) References Cited

U.S. PATENT DOCUMENTS

| 2019/0130249 | A1* | 5/2019 | Bradbury | G06N 3/084 |
| 2021/0365644 | A1* | 11/2021 | Mei | G06N 3/08 |

FOREIGN PATENT DOCUMENTS

| CN | 109145315 A | * | 1/2019 | G06F 40/30 |
| CN | 109670190 A | * | 4/2019 | G06F 40/58 |

(Continued)

OTHER PUBLICATIONS

Weizhen Qi, et al, "BANG: Bridging Autoregressive and Non-autoregressive Generation with Large Scale Pretraining", Proceedigs of the 38th International Conference on Machine Learning, PMLR 139, pp. 1-10, (Year: 2021).*

(Continued)

*Primary Examiner* — Leshui Zhang
(74) *Attorney, Agent, or Firm* — Pillsbury Winthrop Shaw Pittman, LLP

(57) ABSTRACT

A training method, a text translation method, an electronic device, and a storage medium, which relate to a field of artificial intelligence, in particular to fields of natural language processing and deep learning technologies. A specific implementation solution includes: performing a feature extraction on source sample text data to obtain a sample feature vector sequence; obtaining a target sample feature vector according to the sample feature vector sequence; performing an autoregressive decoding and a non-autoregressive decoding on the sample feature vector sequence, respectively; performing a length prediction on the target sample feature vector; training a predetermined model by using translation sample data, the autoregressive text translation result, the non-autoregressive text translation result, a true length value of the source sample text, the first predicted length value, a true length value of the translation sample text, and the second predicted length value to obtain the text translation model.

20 Claims, 6 Drawing Sheets

(51) Int. Cl.
*G06F 40/42* (2020.01)
*G06F 40/51* (2020.01)

(58) Field of Classification Search
CPC ...... G06F 40/44; G06F 40/126; G06F 40/295; G06F 40/284; G06F 40/47; G06F 40/211; G06F 16/35; G06F 16/3329; G06F 16/3344; G06F 16/353; G06F 16/345; G06F 16/355; G06F 18/214; G06F 18/22; G06F 40/53; G06F 40/55; G06F 40/56; G06F 40/40; G06F 40/45; G06F 40/49; G06F 40/263; G10L 15/063; G10L 13/02; G06N 3/08; G06N 5/048; G06N 20/10; G06N 20/20; G06N 20/00
USPC ...... 704/1–9; 706/10, 12, 13, 15, 16, 17, 19, 706/22, 24, 25, 31, 34, 38, 39, 41, 42, 43, 706/59, 60
See application file for complete search history.

(56) References Cited

FOREIGN PATENT DOCUMENTS

| CN | 110852116 | | 2/2020 | | |
|---|---|---|---|---|---|
| CN | 111581988 | | 8/2020 | | |
| CN | 111931736 | | 11/2020 | | |
| CN | 112084331 | A | * 12/2020 | .......... | G06F 16/345 |
| CN | 112115718 | A | * 12/2020 | .......... | G06F 40/289 |
| CN | 112257471 | | 1/2021 | | |
| CN | 113095092 | | 7/2021 | | |
| CN | 113378584 | | 9/2021 | | |
| CN | 113553864 | | 10/2021 | | |

OTHER PUBLICATIONS

Weizhen Qi, et al, "BANG: Bridging Autoregressive and Non-autoregressive Generation with Large Scale Pretraining", Proceedigs of the 38th International Conference on Machine Learning, PMLR 139, pp. 1-10, IDS (Year: 2021).*

Jia et al. "Masking Mechanism based Non-autoregressive Neural Machine Translation", School of Computer Science and Technology, Soochow University, Suzhou 215006, China, p. 648-654, IDS, Jul. 2021.*

Qi, W. et al.: "BANG: Bridging Autoregressive and Non-autoregressive Generation with Large Scale Pre-training", Proceedings of the 38th International Conference on Machine Learning, PMLR 139 (2021).

Jia, H. et al.: "Masking mechanism based non-autoregressive neural machine translation", Journal of Xiamen University(Natural Science), vol. 60, No. 4 (Jul. 2021).

* cited by examiner

400

Source text data of a source text is input into a text translation model to obtain a text translation result for the source text ⎯S410

TRAINING METHOD, TEXT TRANSLATION METHOD, ELECTRONIC DEVICE, AND STORAGE MEDIUM

This application claims priority to Chinese Patent Application No. 202111358246.2 filed on Nov. 16, 2021, which is incorporated herein in its entirety by reference.

TECHNICAL FIELD

The present disclosure relates to a field of artificial intelligence technology, in particular to fields of natural language processing and deep learning technologies. Specifically, the present disclosure relates to a training method, a text translation method, an electronic device, and a storage medium.

BACKGROUND

With a development of artificial intelligence technology, the artificial intelligence technology has been widely used in various fields. For example, in a field of natural language processing in the field of artificial intelligence technology, a text translation has been widely used.

The text translation refers to a translation of a source text into a target text by using a natural language processing method. The source text and the target text are in different languages.

SUMMARY

The present disclosure provides a training method, a text translation method, an electronic device, and a storage medium.

According to an aspect of the present disclosure, a method of training a text translation model is provided, including: performing a feature extraction on source sample text data of a source sample text to obtain a sample feature vector sequence; obtaining a target sample feature vector according to the sample feature vector sequence; performing an autoregressive decoding and a non-autoregressive decoding on the sample feature vector sequence, respectively, to obtain an autoregressive text translation result and a non-autoregressive text translation result; performing a length prediction on the target sample feature vector to obtain a first predicted length value of the source sample text and a second predicted length value of a translation sample text, wherein the translation sample text represents a translation text corresponding to the source sample text; training a predetermined model by using translation sample data of the translation sample text, the autoregressive text translation result, the non-autoregressive text translation result, a true length value of the source sample text, the first predicted length value, a true length value of the translation sample text, and the second predicted length value, so as to obtain a trained predetermined model, wherein the translation sample text data represents a true text translation result corresponding to the source sample text; and obtaining the text translation model according to the trained predetermined model.

According to another aspect of the present disclosure, a method of translating a text is provided, including: inputting source text data of a source text into a text translation model to obtain a text translation result for the source text, wherein the text translation model is trained using the method described above.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method described above.

According to another aspect of the present disclosure, a non-transitory computer-readable storage medium having computer instructions therein is provided, and the computer instructions are configured to cause a computer to implement the method described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Figure 1:
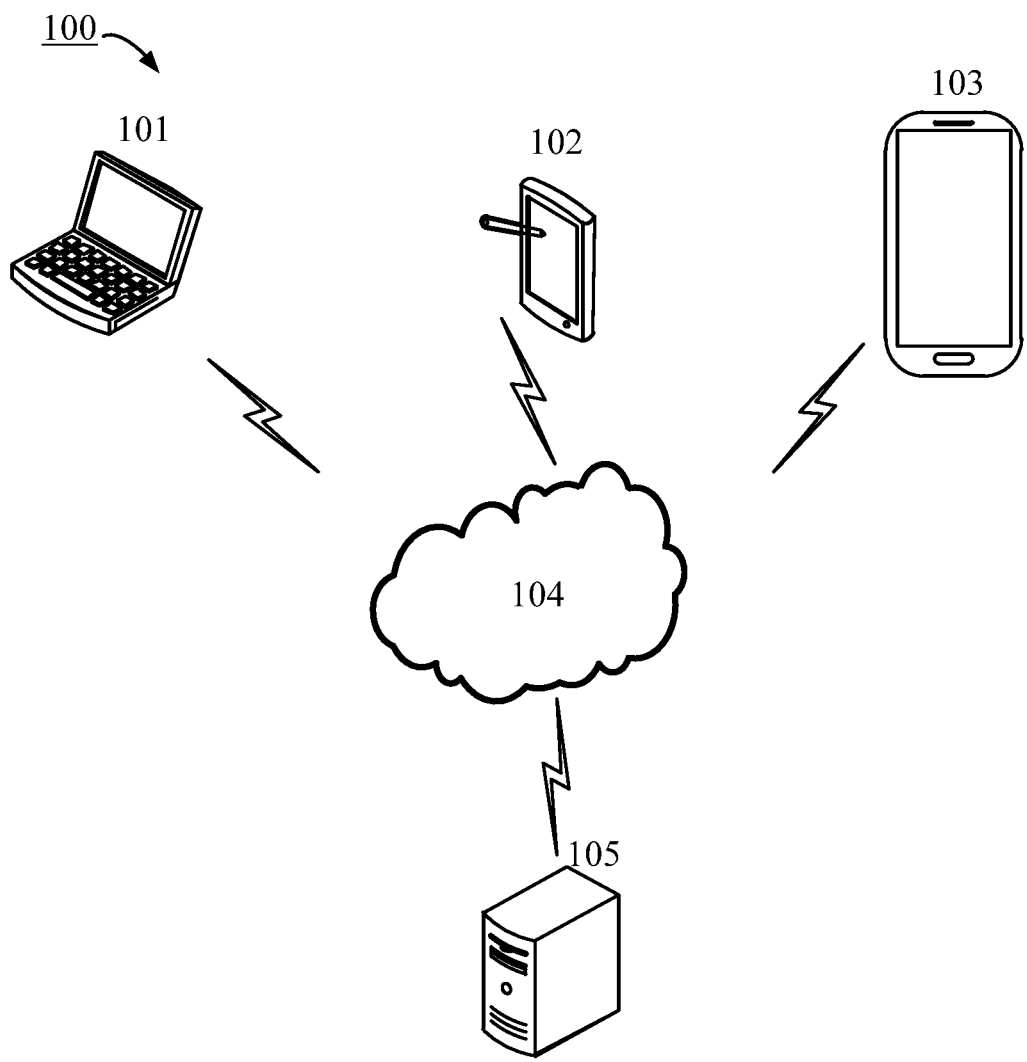
FIG. 1 schematically shows an exemplary system architecture to which a method and an apparatus of training a text translation model and a method and an apparatus of translating a text may be applied according to embodiments of the present disclosure.

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

A text translation model may include an autoregressive text translation model based on autoregressive decoding or a non-autoregressive text translation model based on non-autoregressive decoding. The autoregressive decoding is in line with a language production process, may be performed based on a dependency between objects, and has a good translation effect. However, in the autoregressive decoding, an object-by-object decoding is performed on a plurality of objects included in a text, and a parallel decoding may not be performed, so that a translation speed is slow. The non-autoregressive decoding may achieve a parallel decoding, so that the translation speed is improved. However, in the non-autoregressive decoding, a parallel decoding is performed on a plurality of objects without based on the dependency between objects, so that the translation effect is reduced.

In view of this, embodiments of the present disclosure propose a solution of training a text translation model as follows. A feature extraction is performed on source sample text data of a source sample text to obtain a sample feature vector sequence. A target sample feature vector is obtained according to the sample feature vector sequence. An autoregressive decoding and a non-autoregressive decoding are respectively performed on the sample feature vector sequence to obtain an autoregressive text translation result and a non-autoregressive text translation result. A length prediction is performed on the target sample feature vector to obtain a first predicted length value of the source sample text and a second predicted length value of a translation sample text, and the translation sample text represents a translation text corresponding to the source sample text. A predetermined model is trained by using translation sample text data of the translation sample text, the autoregressive text translation result, the non-autoregressive text translation result, a true length value of the source sample text, the first predicted length value, a true length value of the translation sample text, and the second predicted length value, so as to obtain a trained predetermined model, and the translation sample text data represents a true text translation result corresponding to the source sample text. The text translation model is obtained according to the trained predetermined model.

The text translation model is trained by combining the autoregressive decoding, the non-autoregressive decoding and the length prediction related to non-autoregressive decoding, so that a feature extraction ability of the text translation model may be enhanced, and the translation effect of the text translation model may be improved.

FIG. 1 schematically shows an exemplary system architecture to which a method and an apparatus of training a text translation model and a method and an apparatus of translating a text may be applied according to embodiments of the present disclosure.

It should be noted that FIG. 1 is only an example of the system architecture to which embodiments of the present disclosure may be applied to help those skilled in the art understand the technical content of the present disclosure, but it does not mean that embodiments of the present disclosure may not be applied to other devices, systems, environments or scenarios. For example, in other embodiments, an exemplary system architecture to which a method and an apparatus of training a text translation model and a method and an apparatus of translating a text may be applied may include a terminal device, but the terminal device may implement the method and the apparatus of training the text translation model and the method and the apparatus of translating the text provided in embodiments of the present disclosure without interacting with a server.

As shown in FIG. 1, a system architecture 100 according to such embodiments may include terminal devices 101, 102, 103, a network 104, and a server 105. The network 104 is a medium for providing a communication link between the terminal devices 101, 102, 103 and the server 105. The network 104 may include various connection types, such as wired and/or wireless communication links.

The terminal devices 101, 102, 103 may be used by a user to interact with the server 105 through the network 104 to receive or send messages, etc. The terminal devices 101, 102 and 103 may be installed with various communication client applications, such as knowledge reading applications, web browser applications, search applications, instant messaging tools, email clients, and/or social platform software (for example only).

The terminal devices 101, 102, 103 may be various electronic devices having a display screen and supporting web browsing, including but not limited to smart phones, tablet computers, laptop computers, desktop computers, or the like.

The server 105 may be a server of various types that provides various services, such as a background management server (for example only) that provides a support for a content browsed by the user using the terminal devices 101, 102, 103. The background management server may analyze and process received data such as a user request, and feedback a processing result (such as a web page, an information, or data acquired or generated according to the user request) to the terminal devices.

The server 105 may be a cloud server, also known as a cloud computing server or a cloud host, which is a host product in a cloud computing service system to solve shortcomings of difficult management and weak business scalability existing in an existing physical host and VPS (Virtual Private Server) service. The server 105 may also be a server of a distributed system or a server combined with a block-chain.

It should be noted that the method of training the text translation model and the method of translating the text provided by embodiments of the present disclosure may generally be performed by the server 105. Accordingly, the apparatus of training the text translation model and the apparatus of translating the text provided by embodiments of the present disclosure may be provided in the server 105. The method of training the text translation model and the method of translating the text provided by embodiments of the present disclosure may also be performed by a server or server cluster different from the server 105 and capable of communicating with the terminal devices 101, 102, 103 and/or the server 105. Accordingly, the apparatus of training the text translation model and the apparatus of translating the text provided by embodiments of the present disclosure may also be provided in a server or server cluster different from the server 105 and capable of communicating with the terminal devices 101, 102, 103 and/or the server 105.

Alternatively, the method of training the text translation model and the method of translating the text provided by embodiments of the present disclosure may generally be performed by terminal device 101, 102 or 103. Accordingly, the apparatus of training the text translation model and the apparatus of translating the text provided by embodiments of the present disclosure may also be provided in the terminal device 101, 102 or 103.

It should be understood that the number of terminal devices, network and server in FIG. 1 is only schematic. According to implementation needs, any number of terminal devices, networks and servers may be provided.

Figure 2:
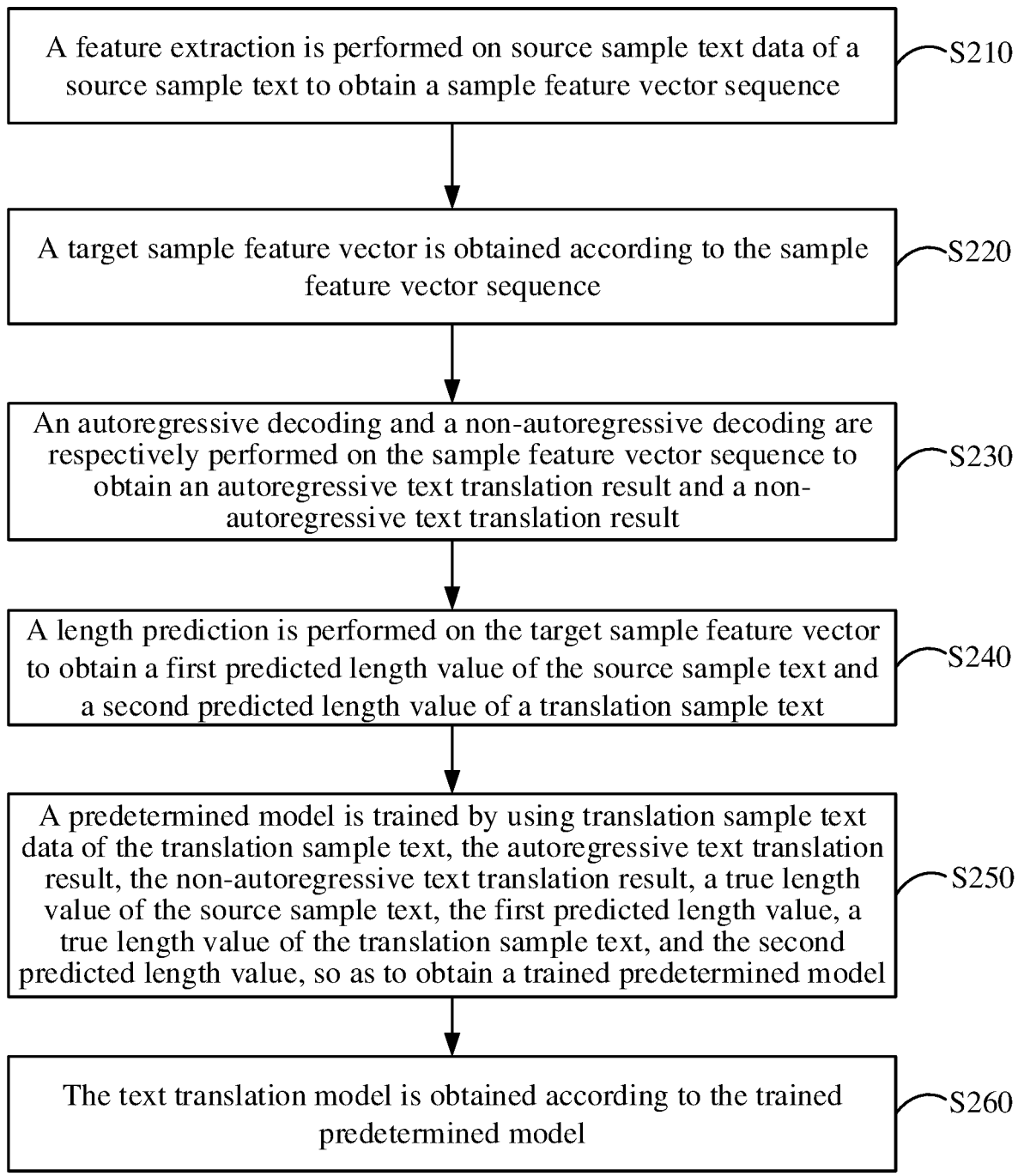
FIG. 2 schematically shows a flowchart of a method of training a text translation model according to embodiments of the present disclosure.

FIG. 2 schematically shows a flowchart of a method of training a text translation model according to embodiments of the present disclosure.

As shown in FIG. 2, a method 200 includes operation S210 to operation S260.

In operation S210, a feature extraction is performed on source sample text data of a source sample text to obtain a sample feature vector sequence.

In operation S220, a target sample feature vector is obtained according to the sample feature vector sequence.

In operation S230, an autoregressive decoding and a non-autoregressive decoding are respectively performed on the sample feature vector sequence to obtain an autoregressive text translation result and a non-autoregressive text translation result.

In operation S240, a length prediction is performed on the target sample feature vector to obtain a first predicted length value of the source sample text and a second predicted length value of a translation sample text. The translation sample text represents a translation text corresponding to the source sample text.

In operation S250, a predetermined model is trained by using translation sample text data of the translation sample text, the autoregressive text translation result, the non-autoregressive text translation result, a true length value of the source sample text, the first predicted length value, a true length value of the translation sample text, and the second predicted length value. The translation sample text data represents a true text translation result corresponding to the source sample text.

In operation S260, the text translation model is obtained according to the trained predetermined model.

According to embodiments of the present disclosure, the source sample text may refer to a text participating in training the text translation model. A plurality of source sample texts may be provided. The source sample text may include a Chinese source sample text or a foreign language source sample text. The source sample text data of the source sample text may include a plurality of objects, and an object may include a word or a phrase. The translation sample text may refer to the translation text corresponding to the source sample text. The translation sample text data of the translation sample text may refer to a true text translation result corresponding to the source sample text. The translation sample text data of the translation sample text may include a plurality of objects. For each object in the translation sample text data, an object corresponding to that object is contained in the source sample text data corresponding to the translation sample text data.

According to embodiments of the present disclosure, the sample feature vector sequence may include a sample feature vector corresponding to each of the plurality of objects. The sample feature vector sequence may include a plurality of sample feature vectors. The target sample feature vector may be determined according to the sample feature vector sequence. For example, the target sample feature vector may be obtained by fusing a plurality of sample feature vectors included in the sample feature vector sequence. Each sample feature vector may include a plurality of feature dimensions, and each feature dimension may have a feature value corresponding to the feature dimension. A number of the feature dimensions of the target sample feature vector may be the same as a number of the feature dimensions of each sample feature vector.

According to embodiments of the present disclosure, the autoregressive text translation result may refer to a text translation result corresponding to the source sample text that is obtained based on autoregressive decoding. The non-autoregressive text translation result may refer to a text translation result corresponding to the source sample text that is obtained based on non-autoregressive decoding. The first predicted length value may refer to a length value of the source sample text. The second predicted length value may refer to a length value of the translation sample text data, that is, the second predicted length value may refer to a length value of the true text translation result corresponding to the source sample text.

According to embodiments of the present disclosure, the predetermined model may include a feature extraction part, an autoregressive decoding part, a non-autoregressive decoding part, and a length prediction part. A model structure of the predetermined model may be configured according to actual business needs, which is not limited here, as long as functions of the above-mentioned parts may be achieved.

According to embodiments of the present disclosure, the source sample text data of the source sample text may be acquired, and the source sample text data may be tokenized to obtain a plurality of objects contained in the source sample text data. A feature extraction may be performed on each of the plurality of objects to obtain a sample feature vector corresponding to each object. The sample feature vector sequence may be obtained according to the sample feature vector corresponding to each object.

According to embodiments of the present disclosure, when the sample feature vector sequence is obtained, the sample feature vector sequence may be processed to obtain a target sample feature vector. For example, for each feature dimension in the plurality of feature dimensions, a statistical feature value corresponding to the feature dimension may be determined. The target sample feature vector may be obtained according to the statistical feature value corresponding to each feature dimension in the plurality of feature dimensions. The statistical feature value may include an average feature value, a maximum feature value, a minimum feature value, or a median feature value. The average feature value may be obtained by averaging a plurality of feature values corresponding to the feature dimension in the plurality of sample feature vectors included in the sample feature vector sequence. The maximum feature value may be a greatest feature value among the plurality of feature values. The minimum feature value may be a smallest feature value among the plurality of feature values. The median feature value may be a feature value in a middle position obtained by sorting the plurality of feature values in a predetermined order. Each feature value may be a feature value corresponding to the feature dimension of each sample feature vector among the plurality of sample feature vectors included in the sample feature vector sequence.

According to embodiments of the present disclosure, when the sample feature vector sequence and the target sample feature vector are obtained, an autoregressive decoding may be performed on the sample feature vector sequence to obtain an autoregressive text translation result. For example, the sample feature vector sequence may be processed by the autoregressive decoding part included in the predetermined model, so as to obtain the autoregressive text translation result. A non-autoregressive decoding may be performed on the sample feature vector sequence to obtain a non-autoregressive text translation result. For example, the sample feature vector sequence may be processed by the non-autoregressive decoding part included in the predetermined model, so as to obtain the non-autoregressive text translation result. A length prediction may be performed on the target sample feature vector to obtain a predicted length value corresponding to the source sample text and a predicted length value corresponding to the translation sample text. The predicted length value corresponding to the source sample text may be referred to as a first predicted length value. The predicted length value corresponding to the translation sample text may be referred to as a second predicted length value. For example, the target sample feature vector may be processed by the length prediction part included in the predetermined model, so as to obtain the first predicted length value and the second predicted length value.

According to embodiments of the present disclosure, it is possible to acquire the translation sample text data (that is, the true text translation result corresponding to the source sample text), the true length value of the source sample text, and the true length value of the translation sample text. When the translation sample text data, the autoregressive text translation result, the non-autoregressive text translation result, the true length value of the source sample text, the first predicted length value, the true length value of the translation sample text and the second predicted length value are obtained, an output value may be obtained based on a loss function by using the translation sample text data, the autoregressive text translation result, the non-autoregressive text translation result, the true length value of the source sample text, the first predicted length value, the true length value of the translation sample text and the second predicted length value. A model parameter of the predetermined model may be adjusted according to the output value until a predetermined condition is met, so as to obtain a trained predetermined model.

According to embodiments of the present disclosure, the output value may include a first output value, a second output value, a third output value, and a fourth output value. The first output value may be obtained based on the loss function by using the translation sample text data and the autoregressive text translation result. The second output value may be obtained based on the loss function by using the translation sample text data and the non-autoregressive text translation result. The third output value may be obtained based on the loss function by using the true length value of the source sample text and the first predicted length value. The fourth output value may be obtained based on the loss function by using the true length value of the translation sample text and the second predicted length value.

According to embodiments of the present disclosure, when the trained predetermined model is obtained, the text translation model may be determined according to the trained predetermined model, that is, the entire trained predetermined model or a part of the trained predetermined model may be determined as the text translation model. For example, the feature extraction part, the autoregressive decoding part and the non-autoregressive decoding part included in the trained predetermined model may be determined as the text translation model. Alternatively, the feature extraction part and the non-autoregressive decoding part included in the trained predetermined model may be determined as the text translation model.

For example, the source sample text data is "我的家乡是一个美丽的小镇", and the translation sample text data (that is, the true text translation result corresponding to the source sample text) is "My hometown is a beautiful town".

The source sample text data "我的家乡是一个美丽的小镇" may be tokenized to obtain a plurality of objects contained in the source sample text data. A feature extraction may be performed on the plurality of objects contained in the source sample text data, so as to obtain the sample feature vector corresponding to each of the plurality of objects contained in the source sample text data, and the sample feature vector sequence may be obtained according to the sample feature vector corresponding to each of the plurality of objects. A plurality of sample feature vectors included in the sample feature vector sequence may be fused to obtain the target sample feature vector. The plurality of objects may include "我", "的", "家", "乡", "是", "一", "个", "美", "丽", "的", "小" and "镇".

An autoregressive processing may be performed on the sample feature vector sequence to obtain an autoregressive text translation result. A non-autoregressive processing may be performed on the sample feature vector to obtain a non-autoregressive text translation result. A length prediction may be performed on the target sample feature vector to obtain a first predicted length value of the source sample text and a second predicted length value of the translation sample text.

An output value may be obtained based on the loss function by using the translation sample text data, the autoregressive text translation result, the non-autoregressive text translation result, the true length value of the source sample text, the first predicted length value, the true length value of the translation sample text, and the second predicted length value. The model parameter of the predetermined model may be adjusted according to the output value until a predetermined condition is met, so as to obtain a trained predetermined model.

According to embodiments of the present disclosure, the text translation model is trained by combining the autoregressive decoding, the non-autoregressive decoding and the length prediction related to non-autoregressive decoding, so that the feature extraction ability of the text translation model may be enhanced, and the translation effect of the text translation model may be improved.

According to embodiments of the present disclosure, the source sample text data may be obtained by masking at least one target object in original source sample text data, and the sample feature vector sequence may include a sample feature vector corresponding to each of the at least one target object.

According to embodiments of the present disclosure, the method of training the text translation model may further include the following operations.

An object prediction is performed on the sample feature vector corresponding to each target object in the at least one target object, so as to obtain an object prediction result corresponding to each target object in the at least one target object.

According to embodiments of the present disclosure, operation S250 may include the following operations.

A first output value is obtained based on the loss function by using the translation sample text data and the autoregressive text translation result. A second output value is obtained based on the loss function by using the translation sample text data and the non-autoregressive text translation result. A third output value is obtained based on the loss function by using the true length value of the source sample text and the first predicted length value. A fourth output value is obtained based on the loss function by using the true length value of the translation sample text and the second predicted length value. A fifth output value is obtained based on the loss function by using a true object result and the object prediction result corresponding to each target object in the at least one target object. The model parameter of the predetermined model is adjusted according to the first output value, the second output value, the third output value, the fourth output value and the fifth output value until a predetermined condition is met, so as to obtain a trained predetermined model.

According to embodiments of the present disclosure, there may be one or more target objects. Masking the target object in the original source sample text data to obtain the source sample text data may include: masking at least one target object in the original source sample text data to obtain the source sample text data. Alternatively, each of the at least one target object in the original source sample text data may be replaced with an object that does not have an association relationship with the plurality of objects included in the original source sample text data, so as to obtain the source sample text data.

According to embodiments of the present disclosure, the sample feature vector sequence corresponding to the source sample text data may include the sample feature vector of each target object in the at least one target object. For each target object in the at least one target object, an object prediction is performed on the sample feature vector corresponding to the target object, so as to obtain a plurality of object probability values corresponding to the target object. The object prediction result corresponding to the target object may be determined according to the plurality of object probability values corresponding to the target object. For example, a prediction may be performed for the target object "镇", so as to output a plurality of object probability values corresponding to the target object "镇". The object prediction result corresponding to the target object "镇" may be determined according to the plurality of object probability values corresponding to the target object "镇".

According to embodiments of the present disclosure, it is possible to obtain a true object result for each target object in the at least one target object. When the translation sample text data, the autoregressive text translation result, the non-autoregressive text translation result, the true length value of the source sample text, the first predicted length value, the true length value of the translation sample text, the second predicted length value, the true object result for each target object in the at least one target object, and the object prediction result are obtained, the translation sample text data and the autoregressive text translation result may be input into the loss function to obtain the first output value, the translation sample text data and the non-autoregressive text translation result may be input into the loss function to obtain the second output value, the true length value of the source sample text and the first predicted length value may be input into the loss function to obtain the third output value, the true length value of the translation sample text and the second predicted length value may be into the loss function to obtain the fourth output value, and the true object result and the object prediction result corresponding to each object in the at least one object may be input into the loss function to obtain the fifth output value.

According to embodiments of the present disclosure, the model parameter of the predetermined model may be adjusted according to the output value until the predetermined condition is met, so as to obtain a trained predetermined model. The output value may include the first output value, the second output value, the third output value, the fourth output value, and the fifth output value. The predetermined condition may include that the output value converges or a number of training epochs reaches a maximum value for the training.

According to embodiments of the present disclosure, the object prediction result is obtained by performing an object prediction on the sample feature vector corresponding to each target object in the at least one target object result so as to obtain the object prediction result corresponding to each target object in the at least one target object. The target object is a masked object. The predetermined model is trained by combining the target prediction, the autoregressive decoding, the non-autoregressive decoding and the length prediction related to non-autoregressive decoding, so as to obtain the text translation model, so that the feature extraction ability of the text translation model may be further enhanced, and the translation effect of the text translation model may be improved.

According to embodiments of the present disclosure, the sample feature vector sequence may include a plurality of sample feature vectors, and each sample feature vector may include a plurality of feature dimensions.

According to embodiments of the present disclosure, operation S220 may include the following operations.

For each feature dimension in the plurality of feature dimensions, an average feature value corresponding to the feature dimension is determined, and the average feature value is obtained by averaging a plurality of feature values corresponding to the feature dimension in the plurality of sample feature vectors. The target sample feature vector is obtained according to the average feature value corresponding to each feature dimension in the plurality of feature dimensions.

According to embodiments of the present disclosure, the sample feature vector sequence may include N sample feature vectors, where N is an integer greater than or equal to 2. The target sample feature vector and each sample feature vector may include M feature dimensions, where M is an integer greater than or equal to 2. The sample feature vector sequence may be represented by T, $T=\{T_1, T_2, \ldots, T_i, \ldots, T_{N-1}, T_N\}$. $T$ represents an $i^{th}$ sample feature vector, $T_i=\{T_{i1}, T_{i2}, \ldots, T_{ij}, \ldots, T_{iM-1}, T_{iM}\}$. $i \in \{1, 2, \ldots, N-1, N\}$. $T_{ij}$ represents a feature value of a $j^{th}$ feature dimension of the $i^{th}$ sample feature vector, $j \in \{1, 2, \ldots, M-1, M\}$. The target sample feature value may be represented by gT, $gT=\{gT_1, gT_2, \ldots, gT_j, \ldots, gT_{M-1}, gT_M\}$. $gT_j$ represents a feature value of the $j^{th}$ feature dimension, $$gT_j = \sum_{i=1}^{N} T_{ij}/N.$$

According to embodiments of the present disclosure, the predetermined model may include an encoder and a non-autoregressive decoder.

According to embodiments of the present disclosure, operation S260 may include the following operations.

A trained encoder and a trained non-autoregressive decoder are determined as the text translation model.

According to embodiments of the present disclosure, the encoder may be used to perform a feature extraction, and the non-autoregressive decoder may be used to perform a non-autoregressive decoding. For example, the encoder may be used to perform a feature extraction on the source sample text data, and/or the encoder may be used to perform a feature extraction on the target object. The non-autoregressive decoder may decode a plurality of objects included in the sample feature vector sequence in a parallel decryption manner. The model structure of the encoder and the model structure of the non-autoregressive decoder may be configured according to actual business requirements, which is not limited here. For example, the encoder may be a Transformer-based encoder, and the non-autoregressive decoder may be a Transformer-based decoder.

According to embodiments of the present disclosure, the text translation model is obtained by joint training based on autoregressive decoding and non-autoregressive decoding, so that the translation effect of the text translation model may be improved. Using the text translation model trained based on non-autoregressive decoding for text translation may improve the translation speed while ensuring the translation effect.

According to embodiments of the present disclosure, the predetermined model may further include an autoregressive decoder.

According to embodiments of the present disclosure, operation S230 may include the following operations.

The sample feature vector sequence is processed by the autoregressive decoder, so as to obtain an autoregressive text translation result. The sample feature vector sequence is processed by the non-autoregressive decoder, so as to obtain a non-autoregressive text translation result.

According to embodiments of the present disclosure, the autoregressive decoder may be used to implement autoregressive decoding. For example, the autoregressive decoder may decode a plurality of objects included in the sample feature vector sequence in an object-by-object manner. The model structure of the autoregressive decoder may be configured according to business requirements, which is not limited here. For example, the autoregressive decoder may be a Transformer-based decoder.

According to embodiments of the present disclosure, the sample feature vector sequence may be input into the autoregressive decoder to obtain the autoregressive text translation result. The sample feature vector sequence may be input into the non-autoregressive decoder to obtain the non-autoregressive text translation result.

According to embodiments of the present disclosure, the predetermined model may further include a first length predictor and a second length predictor.

According to embodiments of the present disclosure, operation S240 may include the following operations.

The target sample feature vector is processed by the first length predictor, so as to obtain a first predicted length value of the source sample text. The target sample feature vector is processed by the second length predictor, so as to obtain a second predicted length of the translation sample text.

According to embodiments of the present disclosure, the first length predictor may be used to perform a length prediction on the source sample text. The second length predictor may be used to perform a length prediction on the translation sample text. The model structure of the first length predictor and the model structure of the second length predictor may be configured according to the actual business requirements, and are not limited here. For example, the first length predictor may be a first linear classifier, and the second length predictor may be a second linear classifier.

According to embodiments of the present disclosure, the target sample feature vector may be input into the first length predictor to obtain the first predicted length value. The target sample feature vector may be input into the second length predictor to obtain the second predicted length value.

According to embodiments of the present disclosure, the predetermined model may further include an object predictor.

According to embodiments of the present disclosure, performing an object prediction on the sample feature vector sequence to obtain an object prediction result may include the following operations.

The object prediction is performed on the sample feature vector corresponding to each target object in the at least one target object by using the object predictor, so as to obtain an object prediction result corresponding to each target object in the at least one target object.

According to embodiments of the present disclosure, the object predictor may be used to predict the target object. The model structure of the object predictor may be configured according to actual business requirements, which is not limited here. For example, the object predictor may be a third linear classifier.

According to embodiments of the present disclosure, the sample feature vector corresponding to each target object in the at least one target object may be input into the object predictor to obtain the object prediction result corresponding to each target object in the at least one target object.

According to embodiments of the present disclosure, operation S210 may include the following operations.

The source sample text data of the source sample text is processed by the encoder, so as to obtain a sample feature vector sequence.

According to embodiments of the present disclosure, the source sample text data may be input into the encoder to obtain the sample feature vector sequence.

The method of training the text translation model described in embodiments of the present disclosure will be further described with reference to FIG. 3 in combination with specific embodiments.

Figure 3:
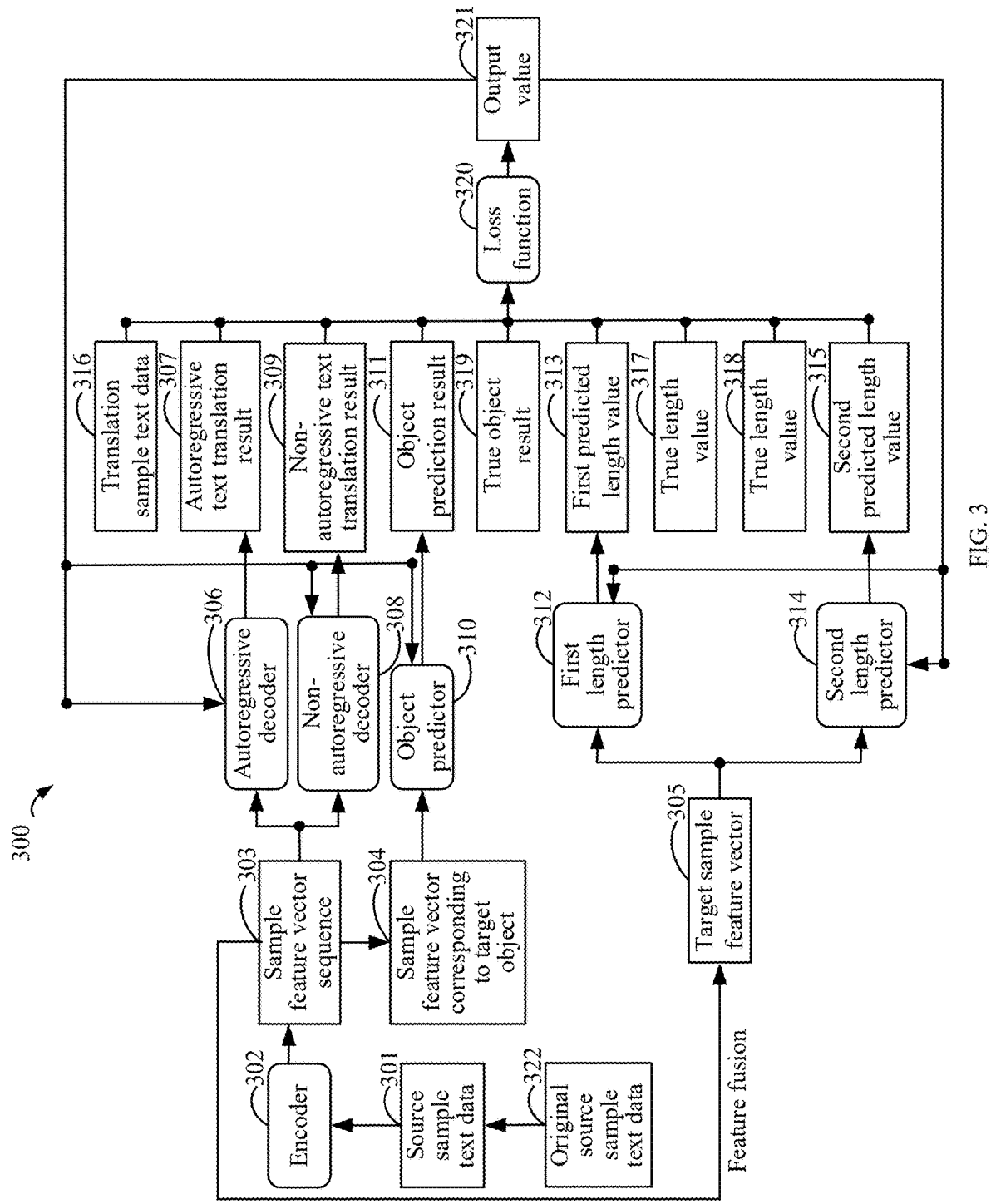
FIG. 3 schematically shows a schematic diagram of a training process of a text translation model according to embodiments of the present disclosure.

FIG. 3 schematically shows a schematic diagram of a training process of a text translation model according to embodiments of the present disclosure.

As shown in FIG. 3, in a training process 300, the predetermined model includes an encoder 302, an autoregressive decoder 306, a non-autoregressive decoder 308, an object predictor 310, a first length predictor 312, and a second length predictor 314. The text translation model may include a trained encoder and a trained non-autoregressive decoder.

Source sample text data 301 of a source sample text is input into the encoder 302 to obtain a sample feature vector sequence 303. The source sample text data is obtained by masking a target object in original source sample text data 322. The sample feature vector sequence includes a sample feature vector 304 corresponding to each target object in at least one target object.

A target sample feature vector 305 is obtained according to the sample feature vector sequence 303.

The sample feature vector sequence 303 is input into the autoregressive decoder 306 and the non-autoregressive decoder 308, respectively, to obtain an autoregressive text translation result 307 and a non-autoregressive text translation result 309.

The sample feature vector 304 corresponding to each target object in at least one target object is input into the object predictor 310 to obtain an object prediction result 311 corresponding to each target object in at least one target object.

A target sample feature vector 305 is input into the first length predictor 312 and the second length predictor 314, respectively, to obtain a first predicted length value 313 of the source sample text and a second predicted length value 315 of the translation sample text.

Translation sample text data 316, the autoregressive text translation result 307, the non-autoregressive text translation result 309, a true object result 319 corresponding to each target object in at least one target object, the object prediction result 311, a true length value 317 corresponding to the source sample text, the first predicted length value 313, a true length value 318 corresponding to the translation sample text, and the second predicted length value 315 are input into a loss function 320 to obtain an output value 321.

A model parameter of the predetermined model is adjusted according to the output value 321 until a predetermined condition is met, so as to obtain a trained predetermined model.

The encoder and the non-autoregressive decoder included in the trained predetermined model are determined as the text translation model.

Figures 4, 5:
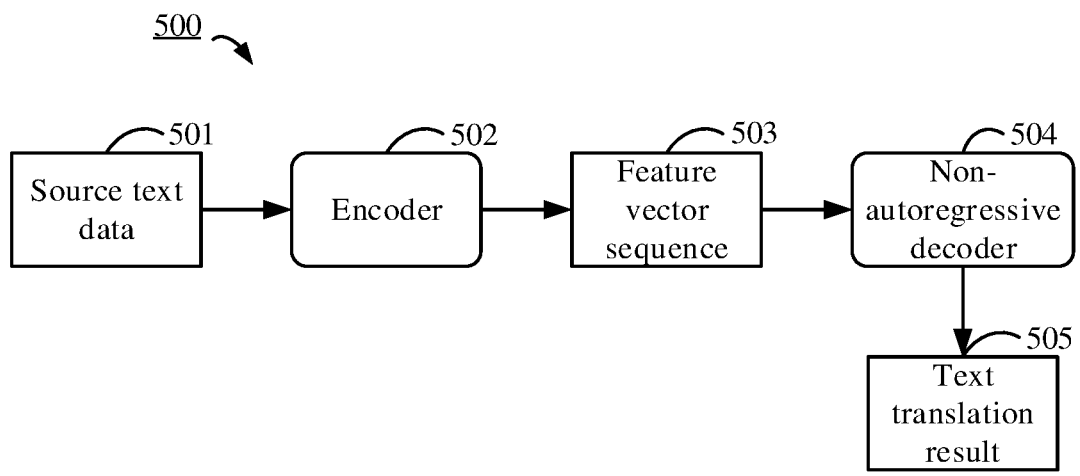
FIG. 4 schematically shows a flowchart of a method of translating a text according to embodiments of the present disclosure.
FIG. 5 schematically shows a schematic diagram of a text translation process according to embodiments of the present disclosure.

FIG. 4 schematically shows a flowchart of a method of translating a text according to embodiments of the present disclosure.

As shown in FIG. 4, a method 400 includes operation S410.

In operation S410, source text data of a source text is input into a text translation model to obtain a text translation result for the source text.

According to embodiments of the present disclosure, the text translation model is trained using the method of training the text translation model described in embodiments of the present disclosure.

According to embodiments of the present disclosure, the text translation model may include a trained encoder and a trained decoder.

According to embodiments of the present disclosure, operation S410 may include the following operations.

The source text data of the source text is input into the encoder to obtain a feature vector sequence. The feature vector sequence is input into the non-autoregressive decoder to obtain the text translation result for the source text.

The method of translating the text described in embodiments of the present disclosure will be further described with reference to FIG. 5 in combination with specific embodiments.

FIG. 5 schematically shows a schematic diagram of a text translation process according to embodiments of the present disclosure.

As shown in FIG. 5, in a text translation process 500, the text translation model includes a trained encoder 502 and a trained non-autoregressive decoder 504.

Source text data 501 of a source text is input into the encoder 502 to obtain a text feature vector sequence 503 of the source text. The text feature vector sequence 503 is input into the non-autoregressive decoder 504 to obtain a text translation result 505 for the source text.

Figure 6:
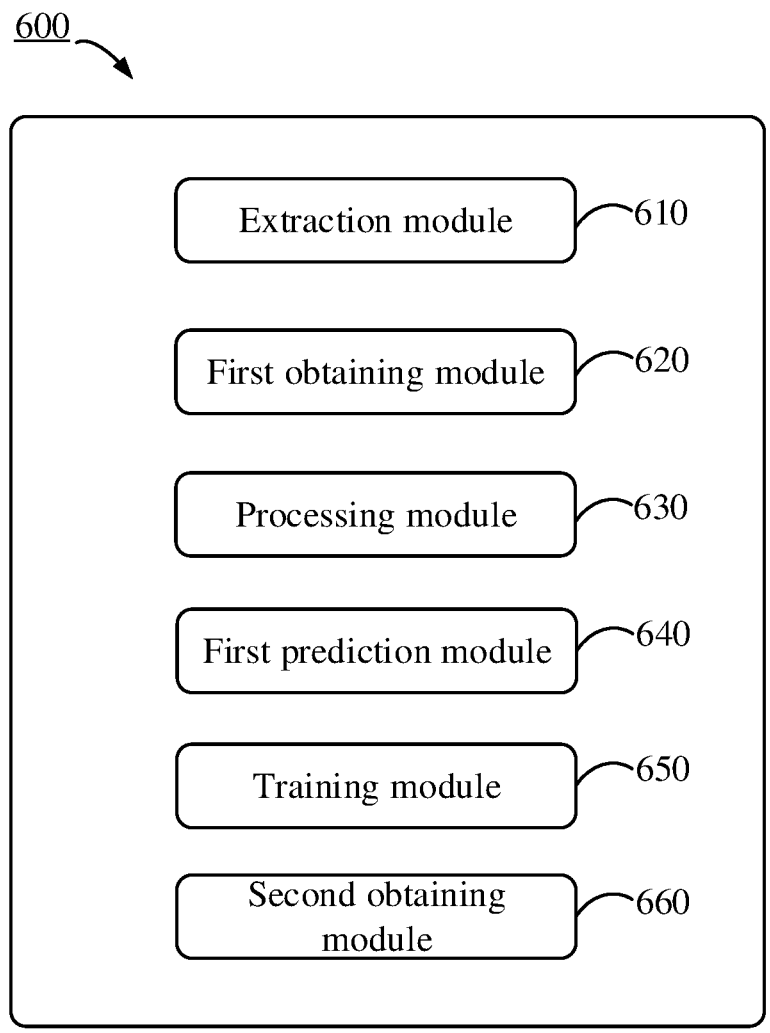
FIG. 6 schematically shows a block diagram of an apparatus of training a text translation model according to embodiments of the present disclosure.

FIG. 6 schematically shows a block diagram of an apparatus of training a text translation model according to embodiments of the present disclosure.

As shown in FIG. 6, an apparatus 600 of training a text translation model may include an extraction module 610, a first obtaining module 620, a processing module 630, a first prediction module 640, a training module 650, and a second obtaining module 660.

The extraction module 610 is used to perform a feature extraction on source sample text data of a source sample text to obtain a sample feature vector sequence.

The first obtaining module 620 is used to obtain a target sample feature vector according to the sample feature vector sequence.

The processing module 630 is used to perform an autoregressive decoding and a non-autoregressive decoding on the sample feature vector sequence, respectively, to obtain an autoregressive text translation result and a non-autoregressive text translation result.

The first prediction module 640 is used to perform a length prediction on the target sample feature vector to obtain a first predicted length value of the source sample text and a second predicted length value of a translation sample text. The translation sample text represents a translation text corresponding to the source sample text.

The training module 650 is used to train a predetermined model by using translation sample data of the translation sample text, the autoregressive text translation result, the non-autoregressive text translation result, a true length value of the source sample text, the first predicted length value, a true length value of the translation sample text, and the second predicted length value, so as to obtain a trained predetermined model. The translation sample text data represents a true text translation result corresponding to the source sample text.

The second obtaining module 660 is used to obtain the text translation model according to the trained predetermined model.

According to embodiments of the present disclosure, the source sample text data is obtained by masking at least one target object in original source sample text data; the sample feature vector sequence includes a sample feature vector corresponding to each target object in the at least one target object.

According to embodiments of the present disclosure, the apparatus 600 of training the text translation model may further includes a second prediction module.

The second prediction module is used to perform an object prediction on the sample feature vector corresponding to each target object in the at least one target object, so as to obtain an object prediction result corresponding to each target object in the at least one target object.

According to embodiments of the present disclosure, the training module 650 may include a first obtaining sub-module, a second obtaining sub-module, a third obtaining sub-module, a fourth obtaining sub-module, a fifth obtaining sub-module, and a training sub-module.

The first obtaining sub-module is used to obtain a first output value based on a loss function by using the translation sample text data of the translation sample text and the autoregressive text translation result.

The second obtaining sub-module is used to obtain a second output value based on the loss function by using the translation sample text data of the translation sample text and the non-autoregressive text translation result.

The third obtaining sub-module is used to obtain a third output value based on the loss function by using the true length value of the source sample text and the first predicted length value.

The fourth obtaining sub-module is used to obtain a fourth output value based on the loss function by using the true length value of the translation sample text and the second predicted length value.

The fifth obtaining sub-module is used to obtain a fifth output value based on the loss function by using a true object result and the object prediction result corresponding to each target object in the at least one target object.

The training sub-module is used to adjust a model parameter of the predetermined model according to the first output value, the second output value, the third output value, the fourth output value and the fifth output value until a predetermined condition is met, so as to obtain the trained predetermined model.

According to embodiments of the present disclosure, the sample feature vector sequence includes a plurality of sample feature vectors, and each of the plurality of sample feature vectors includes a plurality of feature dimensions.

According to embodiments of the present disclosure, the extraction module 610 may include a first determination sub-module and a sixth obtaining sub-module.

The first determination sub-module is used to determine, for each feature dimension in the plurality of feature dimensions, an average feature value corresponding to the feature dimension. The average feature value is obtained by averaging a plurality of feature values corresponding to the feature dimension in the plurality of sample feature vectors.

The sixth obtaining sub-module is used to obtain the target sample feature vector according to the average feature value corresponding to each feature dimension in the plurality of feature dimensions.

According to embodiments of the present disclosure, the predetermined model may include an encoder and a non-autoregressive decoder.

According to embodiments of the present disclosure, the second obtaining module 660 may include a second determination sub-module.

The second determination sub-module is used to determine a trained encoder and a trained non-autoregressive decoder as the text translation model.

According to embodiments of the present disclosure, the processing module 630 may include a seventh obtaining sub-module and an eighth obtaining sub-module.

The seventh obtaining sub-module is used to process the sample feature vector sequence by the autoregressive decoder, so as to obtain the autoregressive text translation result.

The eighth obtaining sub-module is used to process the sample feature vector sequence by the non-autoregressive decoder, so as to obtain the non-autoregressive text translation result.

According to embodiments of the present disclosure, the predetermined model may further include a first length predictor and a second length predictor.

According to embodiments of the present disclosure, the first prediction module 640 may include a ninth obtaining sub-module and a tenth obtaining sub-module.

The ninth obtaining sub-module is used to process the target sample feature vector by the first length predictor, so as to obtain the first predicted length value of the source sample text.

The tenth obtaining sub-module is used to process the target sample feature vector by the second length predictor, so as to obtain the second predicted length value of the translation sample text.

According to embodiments of the present disclosure, the predetermined model may further include an object predictor.

According to embodiments of the present disclosure, the second prediction module may further include an eleventh obtaining sub-module.

The eleventh obtaining sub-module is used to perform the object prediction on the sample feature vector corresponding to each target object in the at least one target object, by using the object predictor, so as to obtain the object prediction result corresponding to each target object in the at least one target object.

According to embodiments of the present disclosure, the extraction module 610 may include a twelfth obtaining sub-module.

The twelfth obtaining sub-module is used to process the source sample text data of the source sample text by using the encoder, so as to obtain the sample feature vector sequence.

Figure 7:
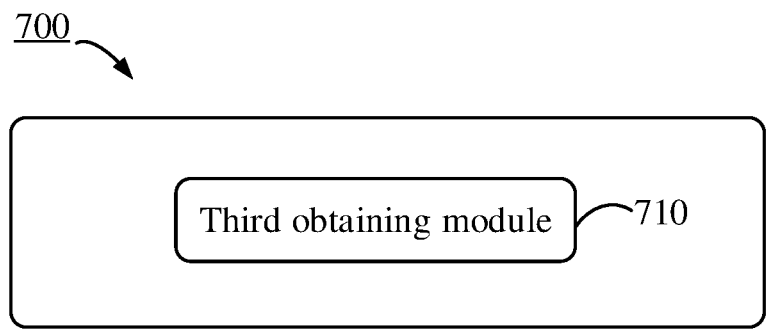
FIG. 7 schematically shows a block diagram of an apparatus of translating a text according to embodiments of the present disclosure.

FIG. 7 schematically shows a block diagram of an apparatus of translating a text according to embodiments of the present disclosure.

As shown in FIG. 7, an apparatus 700 of translating a text may include a third obtaining module 710.

The third obtaining module 710 is used to input source text data of a source text into a text translation model to obtain a text translation result for the source text.

According to embodiments of the present disclosure, the text translation model is trained using the apparatus of training the text translation model described in embodiments of the present disclosure.

According to embodiments of the present disclosure, the text translation model may include a trained encoder and a trained non-autoregressive decoder.

According to embodiments of the present disclosure, the third obtaining module 710 may include a thirteenth obtaining sub-module and a fourteenth obtaining sub-module.

The thirteenth obtaining sub-module is used to input the source text data of the source text into the encoder to obtain a feature vector sequence.

The fourteenth obtaining sub-module is used to input the feature vector sequence into the non-autoregressive decoder to obtain the text translation result for the source text.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor. The memory stores instructions executable by the at least one processor, and the instructions, when executed by the at least one processor, cause the at least one processor to implement the methods described above.

According to embodiments of the present disclosure, a non-transitory computer-readable storage medium having computer instructions therein is provided, and the computer instructions are used to cause a computer to implement the methods described above.

According to embodiments of the present disclosure, a computer program product containing a computer program is provided, and the computer program, when executed by a processor, causes the processor to implement the methods described above.

Figure 8:
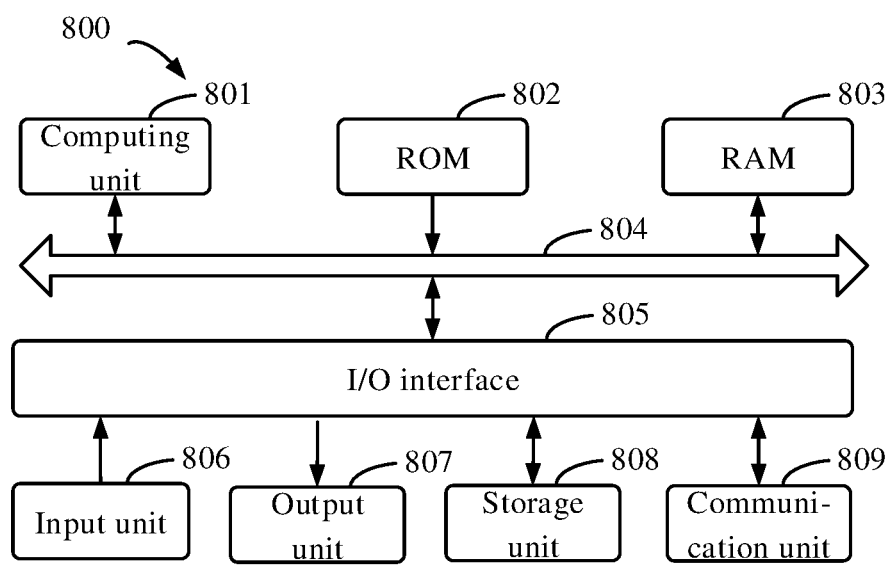
FIG. 8 schematically shows a block diagram of an electronic device suitable for implementing a method of training a text translation model and a method of translating a text according to embodiments of the present disclosure.

FIG. 8 shows a schematic block diagram of an electronic device suitable for implementing the method of training the text translation model and the method of translating the text according to embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 800 includes a computing unit 801 which may perform various appropriate actions and processes according to a computer program stored in a read only memory (ROM) 802 or a computer program loaded from a storage unit 808 into a random access memory (RAM) 803. In the RAM 803, various programs and data necessary for an operation of the electronic device 800 may also be stored. The computing unit 801, the ROM 802 and the RAM 803 are connected to each other through a bus 804. An input/output (I/O) interface 805 is also connected to the bus 804.

A plurality of components in the electronic device 800 are connected to the I/O interface 805, including: an input unit 806, such as a keyboard, or a mouse; an output unit 807, such as displays or speakers of various types; a storage unit 808, such as a disk, or an optical disc; and a communication unit 809, such as a network card, a modem, or a wireless communication transceiver. The communication unit 809 allows the electronic device 800 to exchange information/data with other devices through a computer network such as Internet and/or various telecommunication networks.

The computing unit 801 may be various general-purpose and/or dedicated processing assemblies having processing and computing capabilities. Some examples of the computing unit 801 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 801 executes various methods and steps described above, such as the method of training the text translation model and the method of translating the text. For example, in some embodiments, the method of training the text translation model and the method of translating the text may be implemented as a computer software program which is tangibly embodied in a machine-readable medium, such as the storage unit 808. In some embodiments, the computer program may be partially or entirely loaded and/or installed in the electronic device 800 via the ROM 802 and/or the communication unit 809. The computer program, when loaded in the RAM 803 and executed by the computing unit 801, may execute one or more steps in the method of training the text translation model and the method of translating the text described above. Alternatively, in other embodiments, the computing unit 801 may be configured to perform the method of training the text translation model and the method of translating the text by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a text translation model, implemented by an electronic device, the method comprising:
    performing a feature extraction on source sample text data of a source sample text by an encoder to obtain a sample feature vector sequence, wherein the source sample text data is obtained by masking at least one target object in original source sample text data and wherein the sample feature vector sequence comprises a sample feature vector corresponding to each target object in the at least one target object;
    obtaining a target sample feature vector by fusing a plurality of sample feature vectors included in the sample feature vector sequence;
    performing an autoregressive decoding and a parallel non-autoregressive decoding on the sample feature vector sequence, by an autoregressive decoder and a non-autoregressive decoder respectively, to obtain an autoregressive text translation result and a non-autoregressive text translation result;
    processing the target sample feature vector by a first length predictor to obtain a first predicted length value of the source sample text and processing the target sample feature vector by a second length predictor to obtain a second predicted length value of a translation sample text, wherein the first length predictor and the second length predictor are linear classifiers and wherein the translation sample text represents a translation text corresponding to the source sample text;
    training a predetermined model by using translation sample text data of the translation sample text, the autoregressive text translation result, the non-autoregressive text translation result, a true length value of the source sample text, the first predicted length value, a true length value of the translation sample text, and the second predicted length value, wherein the training comprises adjusting a model parameter of the predetermined model based on a loss function until a predetermined condition is met, wherein the predetermined condition comprises that an output value converges or a number of training epochs reaches a maximum value for the training, and wherein the translation sample text data represents a true text translation result corresponding to the source sample text; and
    obtaining the text translation model according to the trained predetermined model.

2. The method according to claim 1, further comprising performing an object prediction on the sample feature vector corresponding to each target object in the at least one target object, so as to obtain an object prediction result corresponding to each target object in the at least one target object; and
    wherein the training a predetermined model by using translation sample text data of the translation sample text, the autoregressive text translation result, the non-autoregressive text translation result, a true length value of the source sample text, the first predicted length value, a true length value of the translation sample text, and the second predicted length value comprises:
        obtaining a first output value based on the loss function by using the translation sample text data of the translation sample text and the autoregressive text translation result;
        obtaining a second output value based on the loss function by using the translation sample text data of the translation sample text and the non-autoregressive text translation result;
        obtaining a third output value based on the loss function by using the true length value of the source sample text and the first predicted length value;
        obtaining a fourth output value based on the loss function by using the true length value of the translation sample text and the second predicted length value;
        obtaining a fifth output value based on the loss function by using a true object result and the object prediction result corresponding to each target object in the at least one target object; and
        adjusting the model parameter of the predetermined model according to the first output value, the second output value, the third output value, the fourth output value and the fifth output value until the predetermined condition is met, so as to obtain the trained predetermined model.

3. The method according to claim 2, wherein the predetermined model further comprises an object predictor; and
    wherein the performing an object prediction on the sample feature vector corresponding to each target object in the at least one target object, so as to obtain an object prediction result corresponding to each target object in the at least one target object comprises performing the object prediction on the sample feature vector corresponding to each target object in the at least one target object, by using the object predictor, so as to obtain the object prediction result corresponding to each target object in the at least one target object.

4. The method according to claim 2, wherein each of the plurality of sample feature vectors comprises a plurality of feature dimensions; and
    wherein the obtaining a target sample feature vector by fusing a plurality of sample feature vectors included in the sample feature vector sequence comprises:
        determining, for each feature dimension in the plurality of feature dimensions, an average feature value corresponding to the feature dimension, wherein the average feature value is obtained by averaging a plurality of feature values corresponding to the feature dimension in the plurality of sample feature vectors; and
        obtaining the target sample feature vector according to the average feature value corresponding to each feature dimension in the plurality of feature dimensions.

5. The method according to claim 2, wherein the obtaining the text translation model according to the trained predetermined model comprises determining a trained encoder and a trained non-autoregressive decoder as the text translation model.

6. The method according to claim 1, wherein each of the plurality of sample feature vectors comprises a plurality of feature dimensions; and
wherein the obtaining a target sample feature vector by fusing a plurality of sample feature vectors included in the sample feature vector sequence comprises:
determining, for each feature dimension in the plurality of feature dimensions, an average feature value corresponding to the feature dimension, wherein the average feature value is obtained by averaging a plurality of feature values corresponding to the feature dimension in the plurality of sample feature vectors; and
obtaining the target sample feature vector according to the average feature value corresponding to each feature dimension in the plurality of feature dimensions.

7. The method according to claim 6, wherein the obtaining the text translation model according to the trained predetermined model comprises determining a trained encoder and a trained non-autoregressive decoder as the text translation model.

8. The method according to claim 6, wherein the predetermined model further comprises an object predictor; and
wherein the performing an object prediction on the sample feature vector corresponding to each target object in the at least one target object, so as to obtain an object prediction result corresponding to each target object in the at least one target object comprises performing the object prediction on the sample feature vector corresponding to each target object in the at least one target object, by using the object predictor, so as to obtain the object prediction result corresponding to each target object in the at least one target object.

9. The method according to claim 1, wherein the obtaining the text translation model according to the trained predetermined model comprises determining a trained encoder and a trained non-autoregressive decoder as the text translation model.

10. The method according to claim 9, wherein the predetermined model further comprises an object predictor; and
wherein the performing an object prediction on the sample feature vector corresponding to each target object in the at least one target object, so as to obtain an object prediction result corresponding to each target object in the at least one target object comprises performing the object prediction on the sample feature vector corresponding to each target object in the at least one target object, by using the object predictor, so as to obtain the object prediction result corresponding to each target object in the at least one target object.

11. A method of translating a text, the method comprising inputting source text data of a source text into a text translation model to obtain a text translation result for the source text, wherein the text translation model is trained using the method according to claim 1.

12. The method according to claim 11, wherein the text translation model comprises a trained encoder and a trained non-autoregressive decoder; and
wherein the inputting source text data of a source text into a text translation model to obtain a text translation result for the source text comprises:
inputting the source text data of the source text into the encoder to obtain a feature vector sequence; and
inputting the feature vector sequence into the non-autoregressive decoder to obtain the text translation result for the source text.

13. An electronic device, comprising:
at least one processor; and
a memory communicatively connected to the at least one processor, wherein the memory stores instructions executable by the at least one processor, and the instructions, when executed by the at least one processor, cause the at least one processor to at least:
perform a feature extraction on source sample text data of a source sample text by an encoder to obtain a sample feature vector sequence, wherein the source sample text data is obtained by masking of at least one target object in original source sample text data and wherein the sample feature vector sequence comprises a sample feature vector corresponding to each target object in the at least one target object;
obtain a target sample feature vector by fusion of a plurality of sample feature vectors included in the sample feature vector sequence;
perform an autoregressive decoding and a parallel non-autoregressive decoding on the sample feature vector sequence, by an autoregressive decoder and a non-autoregressive decoder respectively, to obtain an autoregressive text translation result and a non-autoregressive text translation result;
process the target sample feature vector by a first length predictor to obtain a first predicted length value of the source sample text and process the target sample feature vector by a second length predictor to obtain a second predicted length value of a translation sample text, wherein the first length predictor and the second length predictor are linear classifiers and wherein the translation sample text represents a translation text corresponding to the source sample text;
train a predetermined model by using translation sample text data of the translation sample text, the autoregressive text translation result, the non-autoregressive text translation result, a true length value of the source sample text, the first predicted length value, a true length value of the translation sample text, and the second predicted length value, wherein the training of the predetermined model comprises adjustment of a model parameter of the predetermined model based on a loss function until a predetermined condition is met, wherein the predetermined condition comprises that an output value converges or a number of training epochs reaches a maximum value for the training, and wherein the translation sample text data represents a true text translation result corresponding to the source sample text; and
obtain the text translation model according to the trained predetermined model.

14. An electronic device, comprising:
at least one processor; and
a memory communicatively connected to the at least one processor, wherein the memory stores instructions executable by the at least one processor, and the instructions, when executed by the at least one processor, cause the at least one processor to at least: input source text data of a source text into a text translation model to obtain a text translation result for the source text, wherein the text translation model is trained using the electronic device according to claim 13.

15. A non-transitory computer-readable storage medium having computer instructions therein, wherein the computer instructions are configured to cause a computer system to at least:

perform a feature extraction on source sample text data of a source sample text by an encoder to obtain a sample feature vector sequence, wherein the source sample text data is obtained by masking of at least one target object in original source sample text data and wherein the sample feature vector sequence comprises a sample feature vector corresponding to each target object in the at least one target object;

obtain a target sample feature vector by fusion of a plurality of sample feature vectors included in the sample feature vector sequence;

perform an autoregressive decoding and a parallel non-autoregressive decoding on the sample feature vector sequence, by an autoregressive decoder and a non-autoregressive decoder respectively, to obtain an autoregressive text translation result and a non-autoregressive text translation result;

process the target sample feature vector by a first length predictor to obtain a first predicted length value of the source sample text and process the target sample feature vector by a second length predictor to obtain a second predicted length value of a translation sample text, wherein the first length predictor and the second length predictor are linear classifiers and wherein the translation sample text represents a translation text corresponding to the source sample text;

train a predetermined model by using translation sample text data of the translation sample text, the autoregressive text translation result, the non-autoregressive text translation result, a true length value of the source sample text, the first predicted length value, a true length value of the translation sample text, and the second predicted length value, wherein the training of the predetermined model comprises adjustment of a model parameter of the predetermined model based on a loss function until a predetermined condition is met, wherein the predetermined condition comprises that an output value converges or a number of training epochs reaches a maximum value for the training, and wherein the translation sample text data represents a true text translation result corresponding to the source sample text; and obtain the text translation model according to the trained perdetermined model.

16. The computer-readable storage medium according to claim 15, wherein the computer instructions are further configured to cause the computer system to perform an object prediction on the sample feature vector corresponding to each target object in the at least one target object, so as to obtain an object prediction result corresponding to each target object in the at least one target object; and wherein the computer instructions configured to cause the computer system to train the predetermined model are further to cause the computer system to:

obtain a first output value based on the loss function by using the translation sample text data of the translation sample text and the autoregressive text translation result;

obtain a second output value based on the loss function by using the translation sample text data of the translation sample text and the non-autoregressive text translation result;

obtain a third output value based on the loss function by using the true length value of the source sample text and the first predicted length value;

obtain a fourth output value based on the loss function by using the true length value of the translation sample text and the second predicted length value;

obtain a fifth output value based on the loss function by using a true object result and the object prediction result corresponding to each target object in the at least one target object; and adjust the model parameter of the predetermined model according to the first output value, the second output value, the third output value, the fourth output value and the fifth output value until the predetermined condition is met, so as to obtain the trained predetermined model.

17. The computer-readable storage medium according to claim 16, wherein the predetermined model further comprises an object predictor; and wherein instructions configured to cause the computer system to perform the object prediction are further configured to cause the computer system to perform the object prediction on the sample feature vector corresponding to each target object in the at least one target object, by using the object predictor, so as to obtain the object prediction result corresponding to each target object in the at least one target object.

18. The computer-readable storage medium according to claim 15, wherein each of the plurality of sample feature vectors comprises a plurality of feature dimensions; and wherein the computer instructions configured to cause the computer system to obtain the target sample feature vector are further configured to cause the computer system to:

determine, for each feature dimension in the plurality of feature dimensions, an average feature value corresponding to the feature dimension, wherein the average feature value is obtained by averaging a plurality of feature values corresponding to the feature dimension in the plurality of sample feature vectors; and obtain the target sample feature vector according to the average feature value corresponding to each feature dimension in the plurality of feature dimensions.

19. The computer-readable storage medium according to claim 15, wherein the computer instructions configured to cause the computer system to obtain the text translation model according to the trained predetermined model are further configured to cause the computer system to determine a trained encoder and a trained non-autoregressive decoder as the text translation model.

20. A non-transitory computer-readable storage medium having computer instructions therein, wherein the computer instructions are configured to cause a computer system to at least input source text data of a source text into a text translation model to obtain a text translation result for the source text, wherein the text translation model is trained using the non-transitory computer-readable storage medium according to claim 15.

* * * * *